United States Patent [19]

Shutt

[11] 4,325,033
[45] Apr. 13, 1982

[54] PNEUMATICALLY DITHERED LASER GYRO

[75] Inventor: Sidney G. Shutt, Brea, Calif.

[73] Assignee: Rockwell International Corporation, El Segundo, Calif.

[21] Appl. No.: 54,331

[22] Filed: Jul. 2, 1979

[51] Int. Cl.³ ............................................. H01S 3/098
[52] U.S. Cl. ..................................... 372/94; 356/350; 372/33; 372/58
[58] Field of Search ............... 331/94.5 C, 94.5 G, 331/94.5 D; 356/350

[56] References Cited

U.S. PATENT DOCUMENTS

| | | | |
|---|---|---|---|
| 3,466,121 | 9/1969 | Turner | 350/321 |
| 3,496,488 | 2/1970 | Fork et al. | 331/94.5 S |
| 3,517,331 | 6/1970 | Baird et al. | 331/94.5 |
| 3,627,422 | 12/1971 | Chodorow | 356/106 |
| 3,686,585 | 8/1972 | Javan et al. | 331/94.5 |
| 3,744,908 | 7/1973 | Podgorski | 356/406 RL |
| 3,791,738 | 2/1974 | Newburgh | 356/106 LR |
| 4,113,387 | 9/1978 | Shutt | 356/106 LR |
| 4,115,004 | 9/1978 | Hutchings et al. | 356/106 LR |

Primary Examiner—William L. Sikes
Assistant Examiner—Leon Scott, Jr.
Attorney, Agent, or Firm—H. Fredrick Hamann; Gilbert H. Friedman

[57] ABSTRACT

A dithered ring laser gyro in which the effects of mode locking, or frequency locking, at low rotation rates are reduced by producing an oscillatory flow of the ionized gas in the gain section of the laser. The envelope in which the laser is sealed includes a pair of closed-end bellows. The bellows are extended and retracted in push-pull to pump the gas. There is thus created a dynamically varying pressure differential and oscillatory gas flow along the bore of the gain section of the laser which induces a corresponding oscillatory bias in the gyro output.

10 Claims, 2 Drawing Figures

PNEUMATICALLY DITHERED LASER GYRO

BACKGROUND OF THE INVENTION

1. Field of the Invention

The present invention relates to ring laser gyroscopes and more particularly pertains to laser gyroscopes which are dithered to reduce the effects of mode locking.

2. Description of the Prior Art

In a laser gyroscope, a pair of counter-rotating light beams are propagated about a closed-loop path. The two beams traveling in opposite directions are compared in frequency. When the gyroscope rotates in inertial space, the two oppositely traveling beams see apparently unequal paths. This causes the laser to resonate at different frequencies for the two beams. The frequency difference may be measured as an indication of the direction and rate of the rotation.

For small rotation rates, however, mode or frequency locking occurs. The frequencies of the two oppositely-directed light beams lock to each other and the beams resonate together. This creates a nonlinear dead zone in the characteristic of the gyro for which no useful output can be obtained.

Among the schemes used to avoid or reduce the effect of the lock-in phenomenon is mechanical body dithering of the gyro. The entire gyro body is mechanically oscillated at a relatively high frequency. This gives the gyro a dynamically varying bias rotation rate which exceeds the threshold input rate or natural lock rate of the dead zone most of the time. This mechanical dither approach has been used successfully. However, it adds undesirable energy consumption, cost, weight, size and mechanical complexity to an attitude reference system employing it. Mechanical dithering also introduces an undesirable source of vibration and noise into a system. This vibration may cause problems in the use of other instruments, such as accelerometers, which may be mounted with the gyro on the same apparatus. An example of a ring laser gyro employing mechanical dither is given in Hutchings et al., "Counterbalanced Oscillating Ring Laser Gyro", U.S. Pat. No. 4,115,004 issued Sept. 19, 1978.

Optically active devices such as, for example, Faraday cells have been inserted into laser cavities to introduce a bias or asymmetry into the operation of the laser to thereby avoid mode locking. An example of such an approach is given in Henry, "Ferrimagnetic Faraday Elements for Ring Lasers", U.S. Pat. No. 4,222,668 issued Sept. 16, 1980, and assigned to Rockwell International Corporation, the assignee herein. Another example, using a birefringent optical element, appears in Newburgh, "Ring Laser Utilizing An Optical Retardation Plate to Prevent Beam Locking", U.S. Pat. No. 3,791,738 issued Feb. 12, 1974. In Newburgh, a varying Fresnel phase velocity shift is obtained by dithering the optical element.

In Henry, "Ring Laser Having Magnetic Isolation of Counter-Propagating Light Waves", U.S. Pat. No. 4,219,275 issued Aug. 26, 1980, and assigned to Rockwell International Corporation, the assignee herein, an optically active device inserted into the laser cavity introduces either a spatial or temporal separation of the counter-propagating light beams. This approach is intended to eliminate mode locking altogether. An approach to simultaneous temporal and spatial separation of the beams using shutters is disclosed in Chodorow, "Means for Avoiding Locking in Ring Lasers", U.S. Pat. No. 3,627,422 issued Dec. 14, 1971.

A problem arises in the approaches to unlocking gyros which insert optical elements in the laser cavity such as the approaches described by Henry, Newburgh, and Chodorow. The optical elements increase the number of interfaces between dissimilar materials in the optical path. Each such interface tends to be a source of increased scattering. The increased scattering tends to enhance the very mode locking effects which are intended to be reduced. Furthermore, the optical elements themselves introduce bias errors into the operation of the gyro due to such factors as, for example, asymmetry in their characteristics and random variations in their characteristics due, for example, to variations in temperature.

Electrical excitation, or pumping power, for lasing is typically applied to the laser gaseous medium from a direct current supply. A voltage sufficient to sustain a discharge in the medium is applied to spaced-apart electrodes. The discharge, or plasma excitation current, comprises a flow of ionized gas between oppositely polarized electrodes in the optical cavity. It has long been known that this plasma flow tends to induce a bias in a ring laser gyro. Therefore, laser gyros which use direct current excitation are typically provided with a balanced electrode structure wherein two electrodes of one polarity are symmetrically disposed about a single electrode of the opposite polarity. With this structure, two equal and opposite plasma excitation currents are caused to flow and their biases are thereby caused to cancel.

It is known that the electrical excitation to sustain the plasma excitation currents may be obtained from a supply which varies the voltage in such a way as to dynamically unbalance those currents. A dynamically varying bias in the gyro output, i.e., dither, may thereby be induced. However, the maximum amount of dither obtainable by the use of dynamically varying unbalance in the plasma excitation currents is too small for this approach to be of practical interest.

A scheme for biasing a ring laser gyro which involves pumping the plasma more vigorously is disclosed in Podgorski, "Externally Biased Ring Laser", U.S. Pat. No. 3,744,908 issued July 10, 1973. A linear induction motor positioned adjacent to the laser gain section pumps the ionized gas unidirectionally. The apparent index of refraction for the two oppositely traveling beams is thereby made different by an amount sufficient to avoid lock-in. This scheme is believed to use large amounts of energy. The requirement for an electromagnet structure increases the weight. In addition, in a scheme such as this where a unidirectional bias is induced, no cancellation of systematic errors occurs.

SUMMARY OF THE INVENTION

By means of the invention, the above-noted shortcomings of the prior art are overcome, and there is provided more efficient mechanical means for inducing relatively large oscillatory flow superimposed on the balanced flow of the ionized gas in the gain section of a ring laser gyro. The output of the gyro is thereby dithered to reduce the effects of mode locking therein.

In a preferred embodiment of the invention, a pair of closed-end bellows, spaced-apart from each other, are mounted on the envelope of a laser gyro at the laser gain section. Each bellows is capable of extension and retraction to locally enlarge and contract the volume of the laser optical cavity. A reciprocated driver arm is coupled to the pair of bellows to operate them in push-pull creating a dynamically varying pressure differential along the bore of the gain section of the optical cavity.

This approach to frequency unlocking a gyro has the advantages of structural simplicity, low weight, small size and relatively low cost. It has relatively low power requirements. Its audible noise level and vibration level are low. No material interfaces which might cause reflections and scattering are required to be added to the optical path. Since gas flows back and forth in the optical cavity, there is a tendency to reduce thermal gradients therein. This could lead to a temperature bias sensitivity lower than can be achieved with body dithering.

Accordingly, it is an object of the invention to provide a new and improved means for reducing the effects of frequency locking in a ring laser.

Another object of the invention is to provide mechanical means for pumping the plasma of a ring laser gyro to produce a dynamically varying bias of the gyro output and consequent reduction of the effects of mode locking due to the resulting oscillatory gas flow therein.

DESCRIPTION OF THE PREFERRED EMBODIMENT

Figure 1:
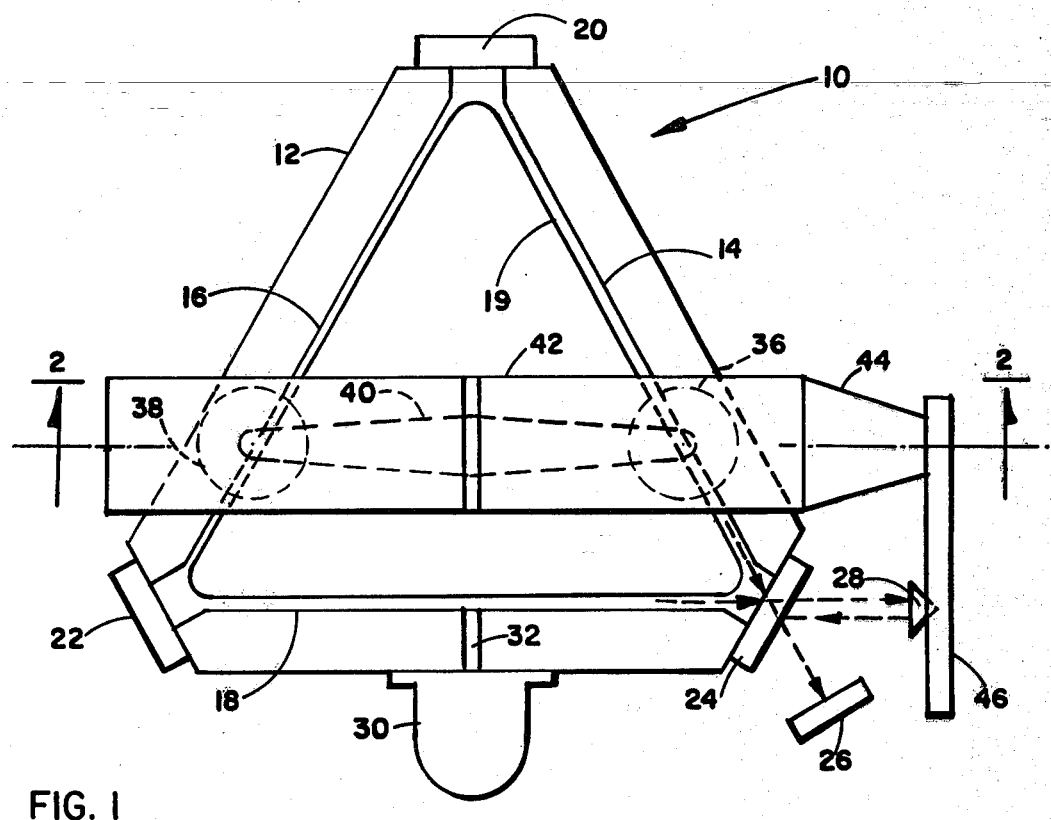
FIG. 1 is a plan view of a ring laser gyroscope in accord with the invention.

Referring now to FIG. 1, there is shown a ring laser gyroscope 10 having a body 12 which is preferably of optical glass having a low coefficient of thermal expansion. Passageways or bores 14, 16 and 18 in the body 12 form a closed polygonal cavity 19 for counter-propagating beams of coherent light. Corner mirrors 20, 22 and 24 at the extremities of each of the bores 14, 16 and 18 reflect the beams of light onto each succeeding leg of the optical path.

Corner mirror 24 is made partially transmissive in order to provide an exit port for a portion of the circulating light energy. Some of the energy of the clockwise circulating light beam exits the optical cavity 19 through mirror 24 and impinges directly on photodetector 26. Some of the energy of the counterclockwise circulating light beam exits the optical cavity 19 through mirror 24 and first strikes corner cube reflector 28. It is reflected back to the mirror 24 and then deflected onto photodetector 26 where it is mixed with the energy from the clockwise circulating light beam. The mixture of the energy from the two counter-propagating light beams is then detected in photodetector 26 to provide an output signal which is a measure of the rotation rate of the gyro 10.

The base 12 forms a sealed envelope containing gas under low pressure in the optical cavity 19. A suitable gas for the laser 10 is the well-known mixture of helium and neon. Electrodes are disposed in communication with the optical cavity 19 so that an electrical discharge for plasma excitation and lasing may be maintained in the gas. A single centrally-located cathode 30 of a suitable metal communicates with the bore 18 through passageway 32. Similarly, an anode 36 communicates with the bore 14 and another anode 38 communicates with the bore 16. The anodes 36 and 38 are symetrically disposed about the cathode 30 at locations on the optical path 19 which are selected to provide a desired length for the gain section of the laser relative to the length of the entire optical cavity. The laser gain section is the portion of the optical cavity 19 in which the electrodes 30, 36 and 38, when energized, will maintain a discharge in the ionized gas, or plasma. Balanced electrical voltages are applied between the anodes 36 and 38 and the cathode 30 to provide substantially equal, and therefore balanced, plasma excitation currents flowing in the laser gain section.

The anodes 36 and 38 may be structures serving as electrodes only. However, in the preferred embodiment, anodes 36 and 38 are formed as flexible bellows of a suitable metal. Bellows 36 and 38 are dynamically flexed to provide a flow of the gas in the laser gain section. They are mechanically linked to each other through a bellows driver arm 40. Oscillatory or reciprocating motion is imparted to driver arm 40 by means of a piezo bimorph driver 42. Of course, when the bellows 36 and 38 are implemented as structures which do not function as electrodes, there is no need to impart any motion to the other distinct structures which do serve as electrodes. The driver 42 is also connected through a corner cube driver link 44 to a post 46 on which the corner cube reflector 28 is mounted. The function of these interrelated parts is shown more clearly in FIG. 2.

Figure 2:
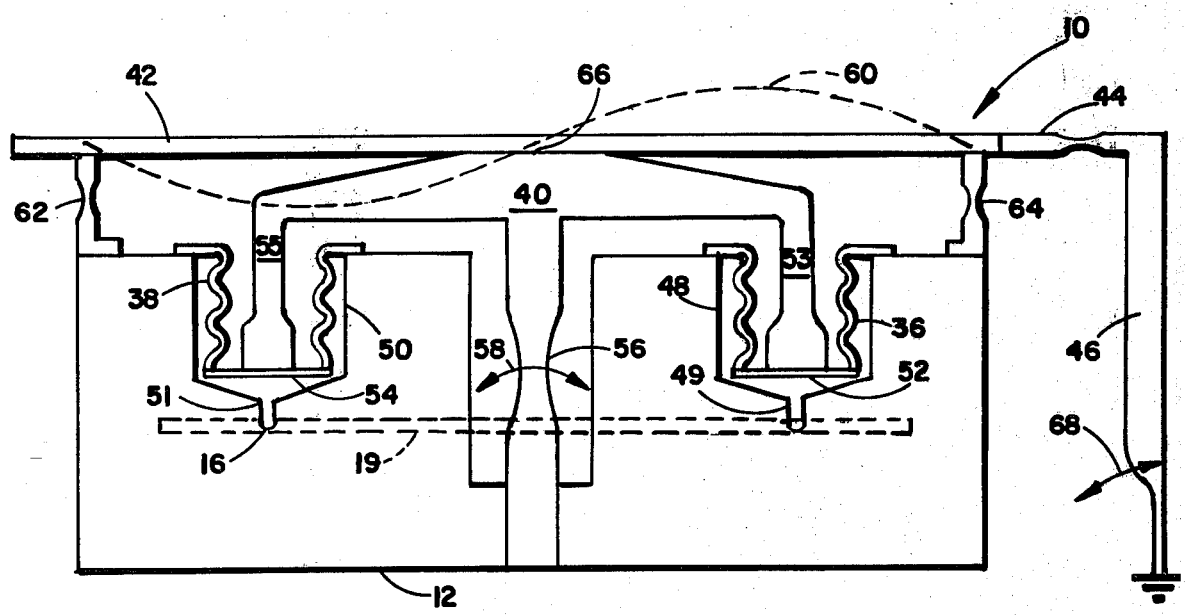
FIG. 2 is a cross-section view of the gyroscope taken on the line 2—2 of FIG. 1 looking in the direction of the arrows.

Referring now to FIG. 2, the body 12 of the laser gyro 10 is provided with wells 48 and 50 communicating with the optical cavity 19. Well 48 includes a passageway 49 in direct communication with bore 14 while well 50 includes a passageway 51 in direct communication with bore 16. The bellows 36 is disposed in well 48. Bellows 36 has an end plate or diaphragm 52 sealed across and closing the lower end thereof. Bellows 36 and diaphragm 52 are attached to each other and to the laser body 12 in such a way as to maintain the optical cavity 19 sealed from the external environment. Similarly, in well 50, the bellows 38 and diaphragm 54 closing the lower end thereof are attached to each other and to the laser body 12 in such a way as to form a portion of the envelope sealing the optical cavity 19 from the external environment. Closed-end bellows 36 and 38 are each disposed to be displaced from and outside the optical path of the laser 10.

Each of diaphragms 52 and 54 are engaged with opposing extensions 53 and 55, respectively, of the bellows driver arm 40 so that reciprocating rotation of the driver arm 40 about a driver arm flexure 56, as indicated by curved, double-ended arrow 58, causes push-pull motion of the two closed-end bellows 36 and 38. When the bellows drive arm 40 is rotated counterclockwise, bellows 38 is extended and diaphragm 54 forces gas into the optical cavity 19. At the same time, since bellows 36 is retracted, diaphragm 52 draws gas out of the optical cavity 19. Conversely, when the bellows driver arm 40 is rotated clockwise, bellows 36 is extended and diaphragm 52 forces gas into the optical cavity 19. At the same time, since bellows 38 is retracted, diaphragm 54 draws gas out of the cavity 19. Thus, when bellows driver arm 40 is dynamically oscillated back and forth, diaphragms 52 and 54 in combination with bellows 36 and 38, respectively, function as mechanical pumps operating in push-pull to dynamically vary the pressure differential along the optical cavity of the laser 10 and to produce an oscillatory and dynamically reciprocating flow of the gas therein. An oscillatory flow of the plasma in the laser gain section will produce an oscillatory bias or dither in the output of the ring laser gyro 10.

Analysis has shown that the ionized gas in the gain section can be given an oscillatory flow of sufficient amplitude to produce a desired level of frequency modulation in the beams. A readily achievable pressure variation amplitude at each bellows of 80 dyne/cm$^2$ at a frequency of 100 Hz can typically produce a modulation index of at least 300. With this modulation index, the effective lock rate may be reduced to less than 0.1 deg/hr. This performance may be improved further by superimposing a random dither on the sinusoidal dither.

A variety of ways are known for producing the requisite rotary oscillatory or reciprocating motion in the bellows driver arm 40. As mentioned above, the preferred technique uses a piezo bimorph driver 42 engaged with driver arm 40. Piezo bimorph drivers are well known in the art. They are fabricated by forming a laminate which includes two layers of piezoelectric material and an intermediate layer of electrode material interposed between the two piezoelectric layers. Layers of electrode material are also disposed on the outer surfaces of the laminate. When a voltage is applied between the intermediate electrode and the two outer electrodes, the laminate bows because one layer of piezoelectric material shrinks while the other elongates. If the voltage is reversed, the bimorph bows in the opposite direction. In the preferred embodiment, each outer electrode of the driver 42 is formed as two separate electrodes so that each side of the driver can be energized with a voltage 180° out of phase with the voltage applied to the other side. When so energized, the bowing of the driver 42 tends to follow an S-curve as indicated by dashed line 60 in FIG. 2.

The bimorph driver 42 and the driver arm 40 bear against each other at their centers as indicated at 66. The bimorph driver 42 is attached to the base 12 by two laterally compliant mounting posts 62 and 64. Oscillatory rotation of the bellows driver arm 40 about its laterally compliant centrally located flexure 56, as indicated by double-ended arrow 58, is produced when an alternating voltage is applied to the driver electrodes (not shown) in the manner described above. Structural details of the bimorph driver 42 are not shown in FIG. 2. A similar, but more elaborate, device is shown and discussed in U.S. Pat. No. 4,113,387, "Dual Mode Laser Optics Control for Ring Laser Gyro", issued Sept. 12, 1978, to S. G. Shutt, the inventor herein, and assigned to Rockwell International Corporation, the assignee herein.

The bimorph driver 42 is shown coupled to the post 46 through corner cube driver link 44. As the driver arm 40 vibrates, corner cube driver link 44 draws the post 46 toward the base 12. The post 46 is caused to rotate about a point near its bottom as indicated by double-ended arrow 68. As was indicated in FIG. 1, the corner cube 28 is mounted on the post 46. Corner cube 28 is not shown in FIG. 2. There is thus provided a means for drawing the corner cube 28 toward the base 12 with a reciprocating motion which is synchronized to the dither applied to the gas in the laser gain section. A compensating doppler frequency drift is thereby induced in the laser output beam which impinges on corner reflector 28. The amplitude of this doppler shift is adjusted to be such that when the affected beam is mixed with the other beam, the dither bias signal induced by the gas flow oscillation does not appear in the gyro output. This approach is analogous to the approach used in mechanical body dithered ring laser gyros wherein the dither bias signal is typically removed by the use of a stationary corner cube reacting with a light beam exiting on a dynamically varying path.

Although the invention has been disclosed and illustrated in detail, it is to be clearly understood that the same is by way of illustration and example only and is not to be taken by way of limitation. The spirit and scope of this invention is limited only by the terms of the appended claims.

What is claimed is:

1. A ring laser gyro, comprising
  an envelope for an optical resonant cavity, wherein said envelope contains an active gas medium;
  electrically energizable electrode means for establishing an electrical discharge in said active gas medium thereby exciting a pair of light beams counterpropagating in said optical resonant cavity, wherein said light beams tend to exhibit mode locking;
  mechanical means for inducing an oscillatory flow of said active gas medium in said optical resonant cavity whereby mode locking effects are reduced; and
  means for generating an output signal for said gyro by measuring a difference in the frequencies of said light beams.

2. The ring laser gyro recited in claim 1, wherein said mechanical means for inducing an oscillatory flow comprises:
  flexible means mounted on said envelope for locally enlarging and contracting the volume of said optical cavity; and
  means for extending and retracting said flexible means.

3. The ring laser gyro recited in claim 2 wherein said flexible means comprises a pair of closed-end bellows spaced apart from each other.

4. The ring laser gyro recited in claim 3, wherein said means for extending and retracting comprises a driver arm coupled to said pair of bellows and wherein said driver arm is arranged to extend and retract said pair of bellows in push-pull fashion.

5. The ring laser gyro recited in claim 4, further comprising piezo bimorph means for imparting reciprocating motion to said driver arm.

6. The ring laser gyro recited in claim 5, further comprising:
  an output beam reflector interposed between said optical cavity and said means for generating an output signal, wherein said output beam reflector is mounted to intercept light from one of said light beams after it exits said optical cavity and to redirect it to said means for generating an output signal; and
  means coupled to said piezo bimorph means for imparting reciprocating motion to said output beam reflector to reduce variation due to dither in said output signal, wherein said motion imparted to said output beam reflector is synchronous with the motion imparted to said driver arm.

7. A ring laser gyro, comprising:
  a base having an optical resonant cavity therein, wherein said cavity is filled with an active gas medium;
  electrically energizable electrode means for establishing an electrical discharge in said active gas medium thereby exciting a pair of light beams counter-propagating in said optical resonant cavity, wherein said light beams tend to exhibit mode locking and wherein said electrode means defines a gain section of said optical cavity;

means for generating an output signal for said gyro by measuring a difference in the frequencies of said light beams; and mechanical pumping means for producing a dynamically varying pressure differential along said gain section of said optical resonant cavity, whereby mode locking effects are reduced.

8. The ring laser gyro recited in claim 7, wherein said mechanical pumping means comprises:

a pair of bellows spaced apart from each other on said base; and driver arm means, coupled to said pair of bellows, for extending and retracting said pair of bellows in push-pull.

9. A method of dithering a ring laser gyro, wherein said gyro has an optical resonant cavity, a gain section in said cavity in which an active gas medium is ionized by electrical discharge to excite counter-propagating light beams in said optical cavity, wherein said light beams tend to exhibit mode locking, said method comprising:

producing an oscillatory pressure differential of said active gas medium along said gain section, whereby mode locking effects are reduced.

10. A method of dithering a ring laser gyro, wherein said gyro has an optical resonant cavity, a gain section in said cavity in which an active gas medium is ionized by electrical discharge to excite counter-propagating light beams in said optical cavity, wherein said light beams tend to exhibit mode locking, said method comprising:

mechanically producing a reciprocating flow of said ionized gas along said gain section, whereby mode locking effects are reduced.

* * * * *